F. MÜLLER.
TAP MAKING MACHINE.
APPLICATION FILED FEB. 8, 1911. RENEWED OCT. 23, 1917.
1,273,904.
Patented July 30, 1918.
9 SHEETS—SHEET 7.
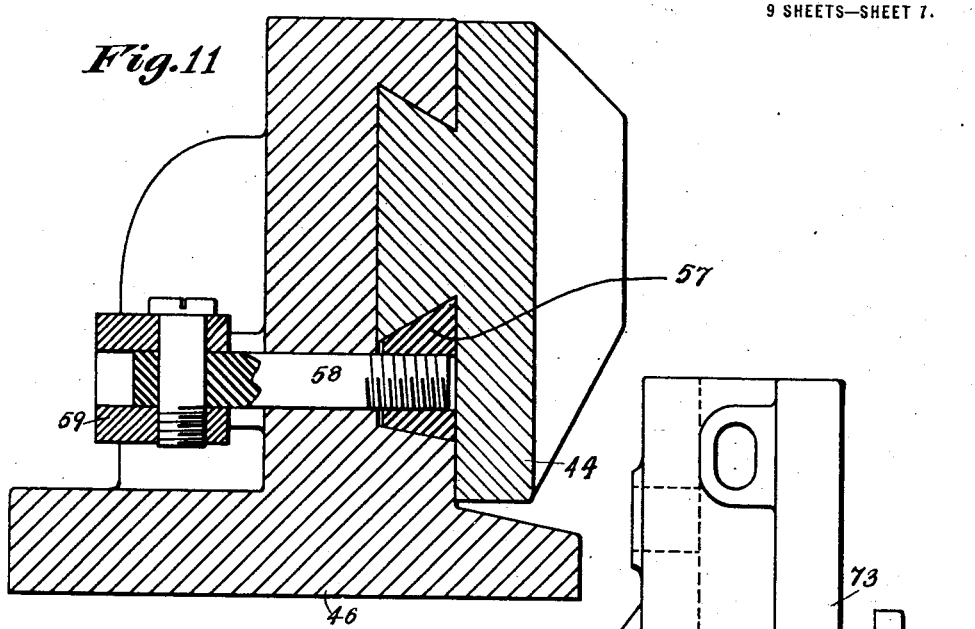
*Fig. 11*
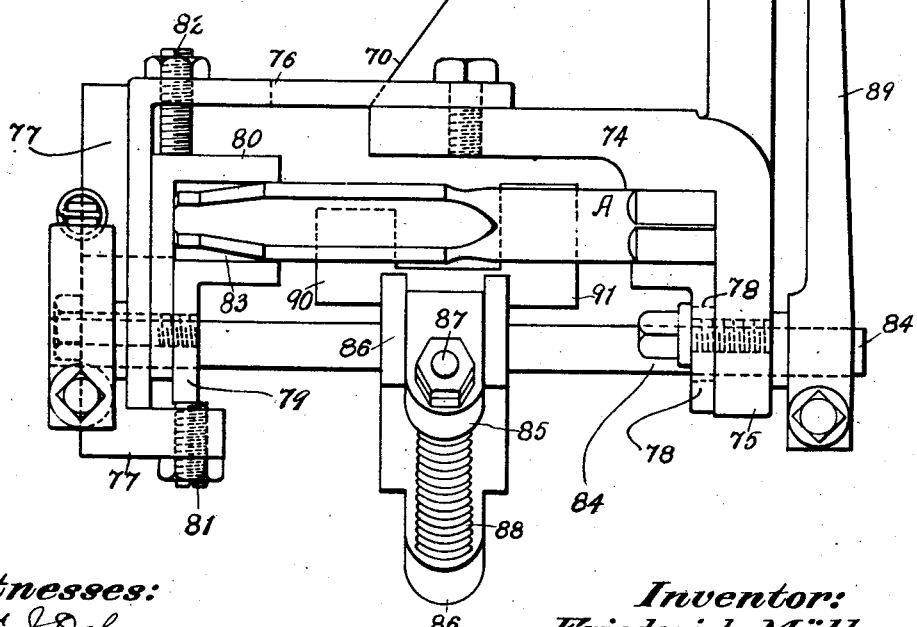
*Fig. 8ᵇ*
Witnesses:
Wm J. Dolan
R. R. Murphy
Inventor:
Friederich Müller
By his Attorney
J. H. Freeman

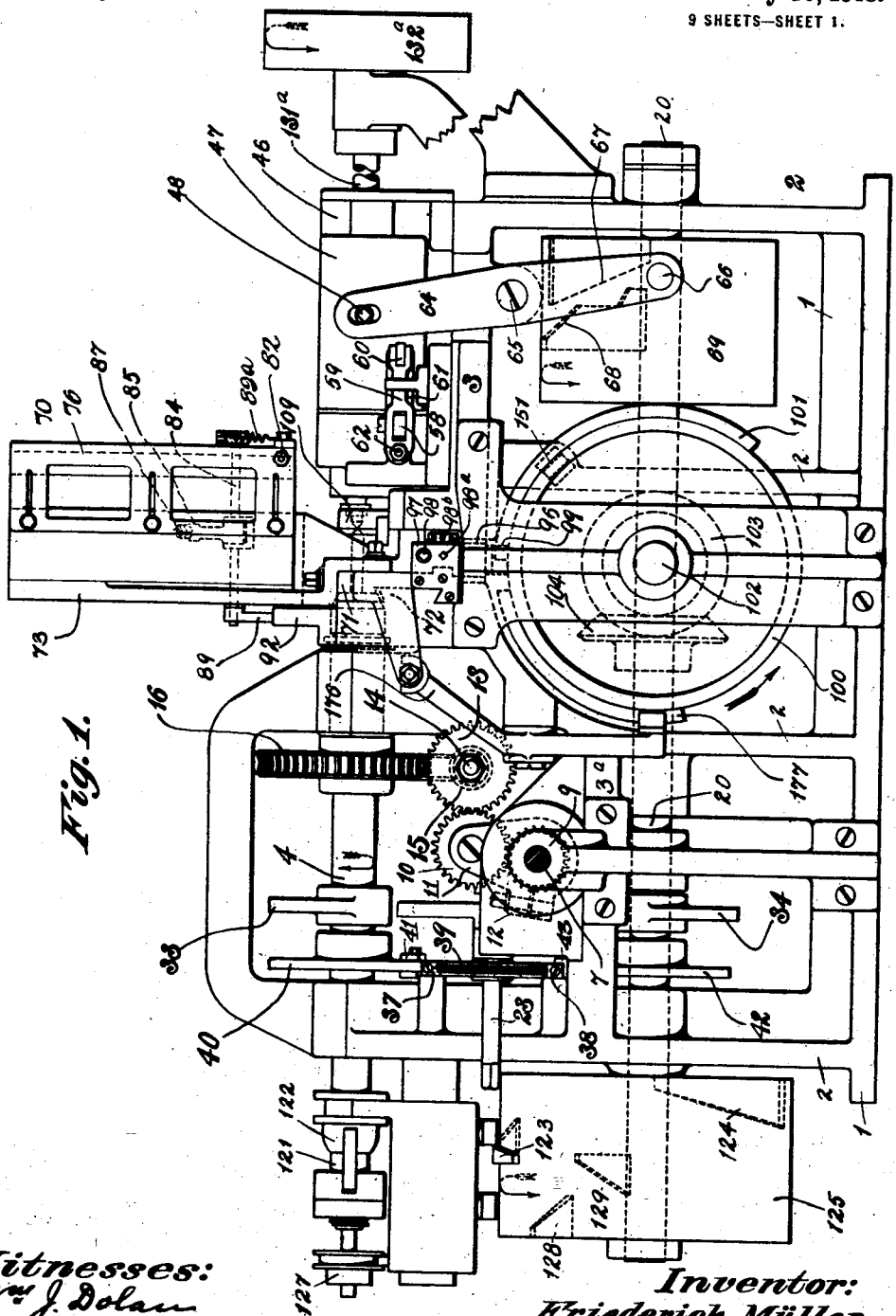

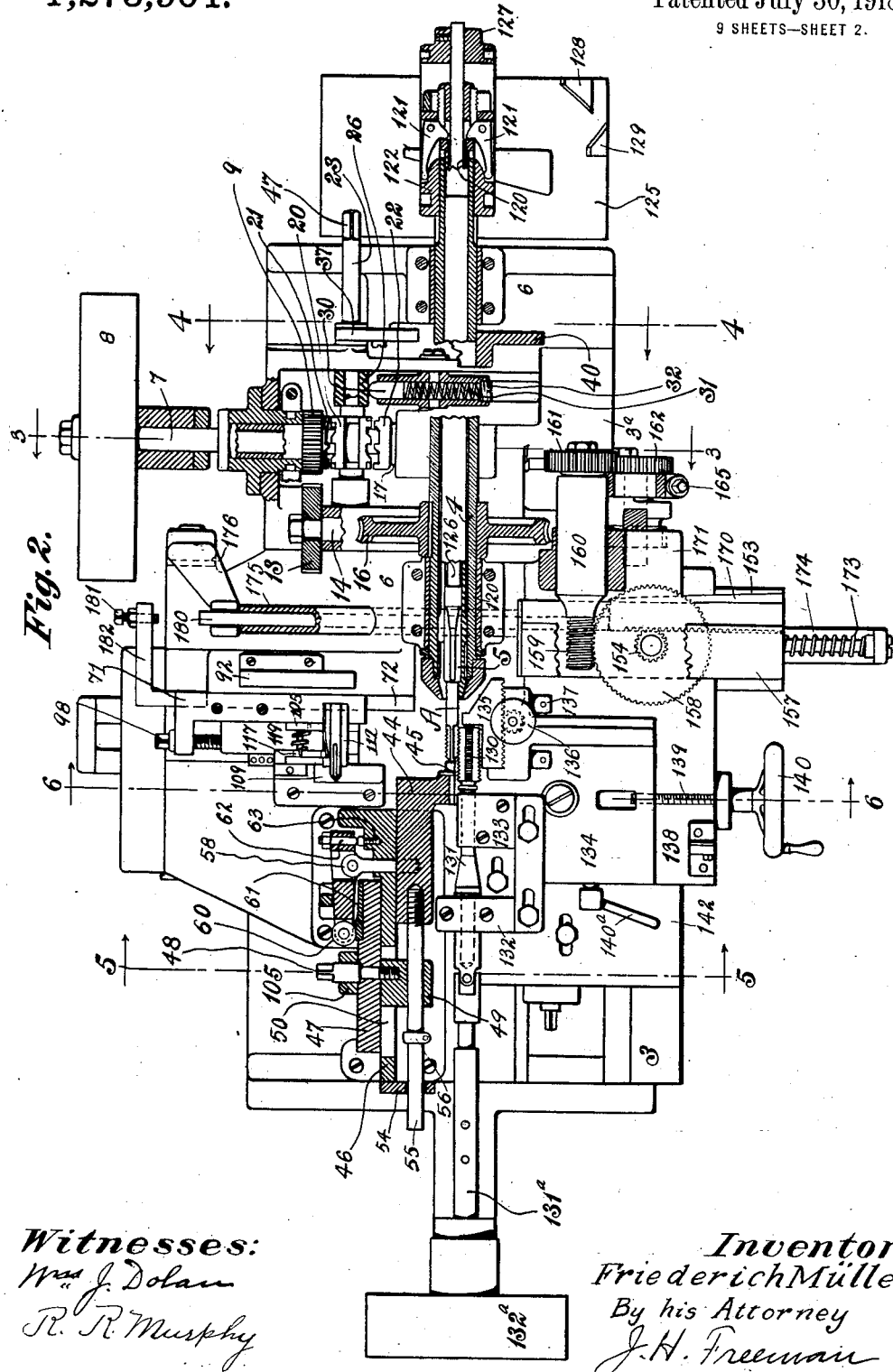

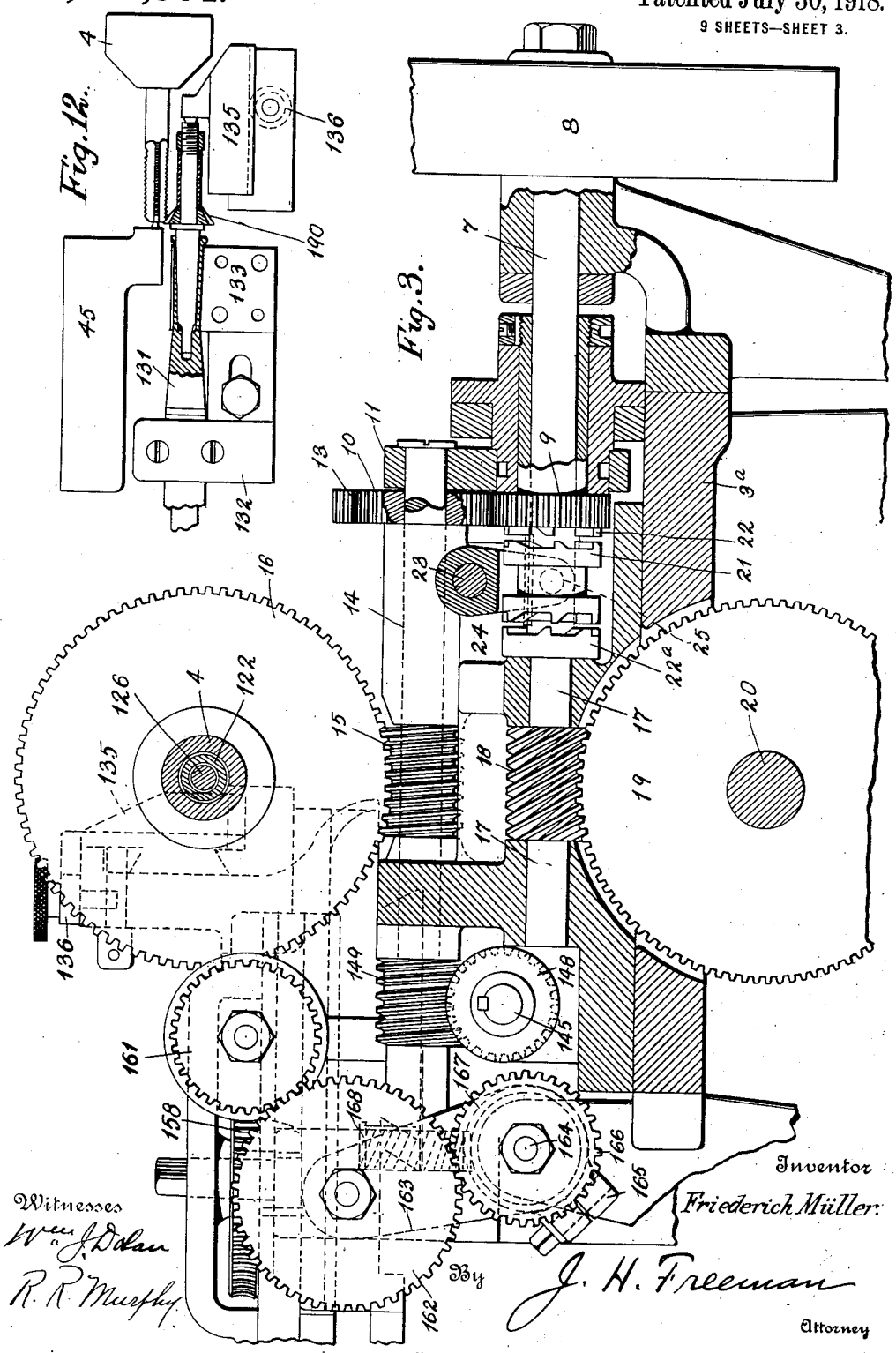

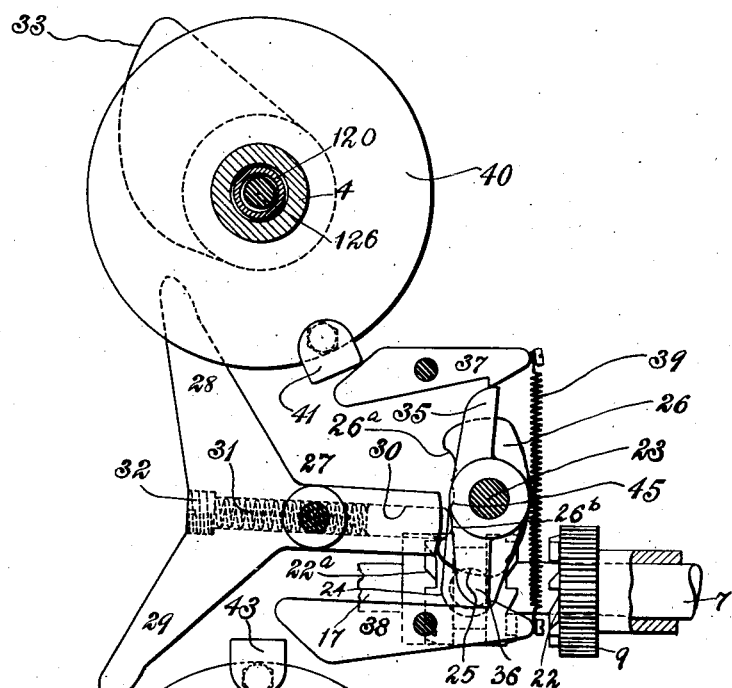
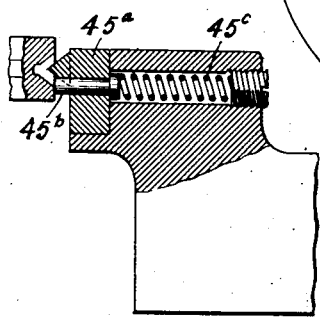
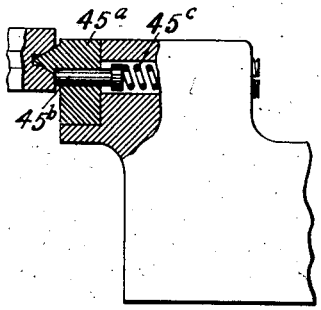

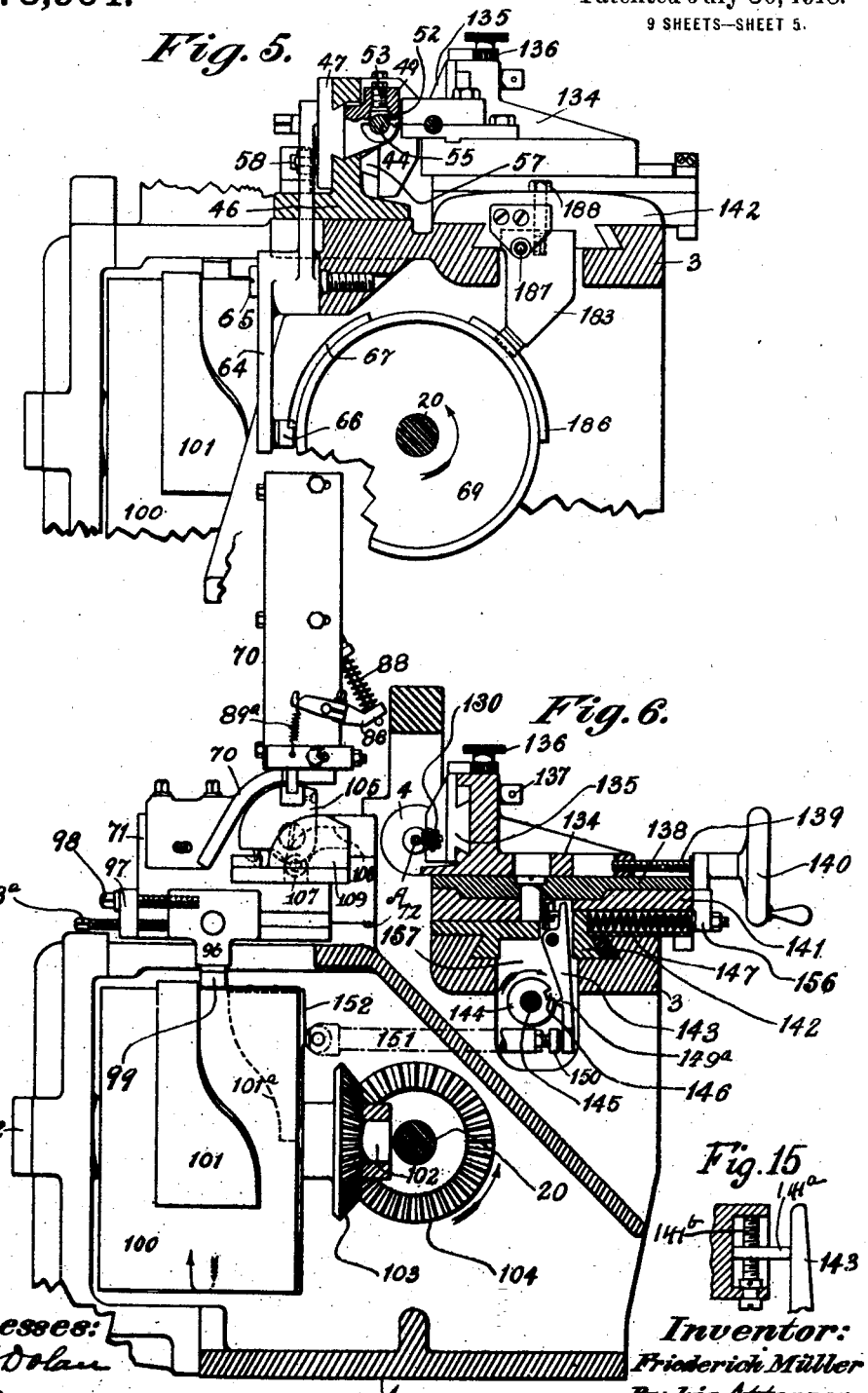

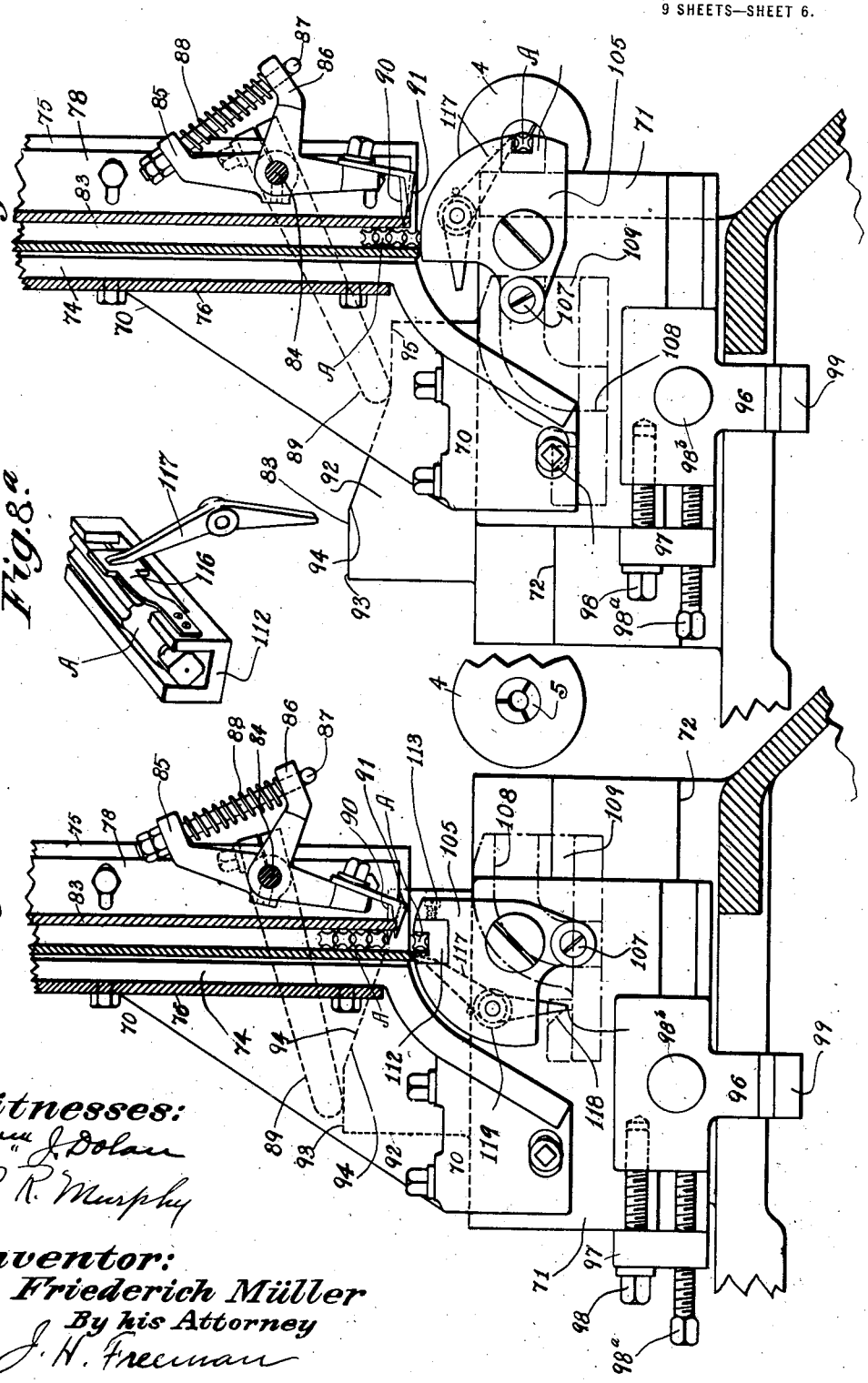

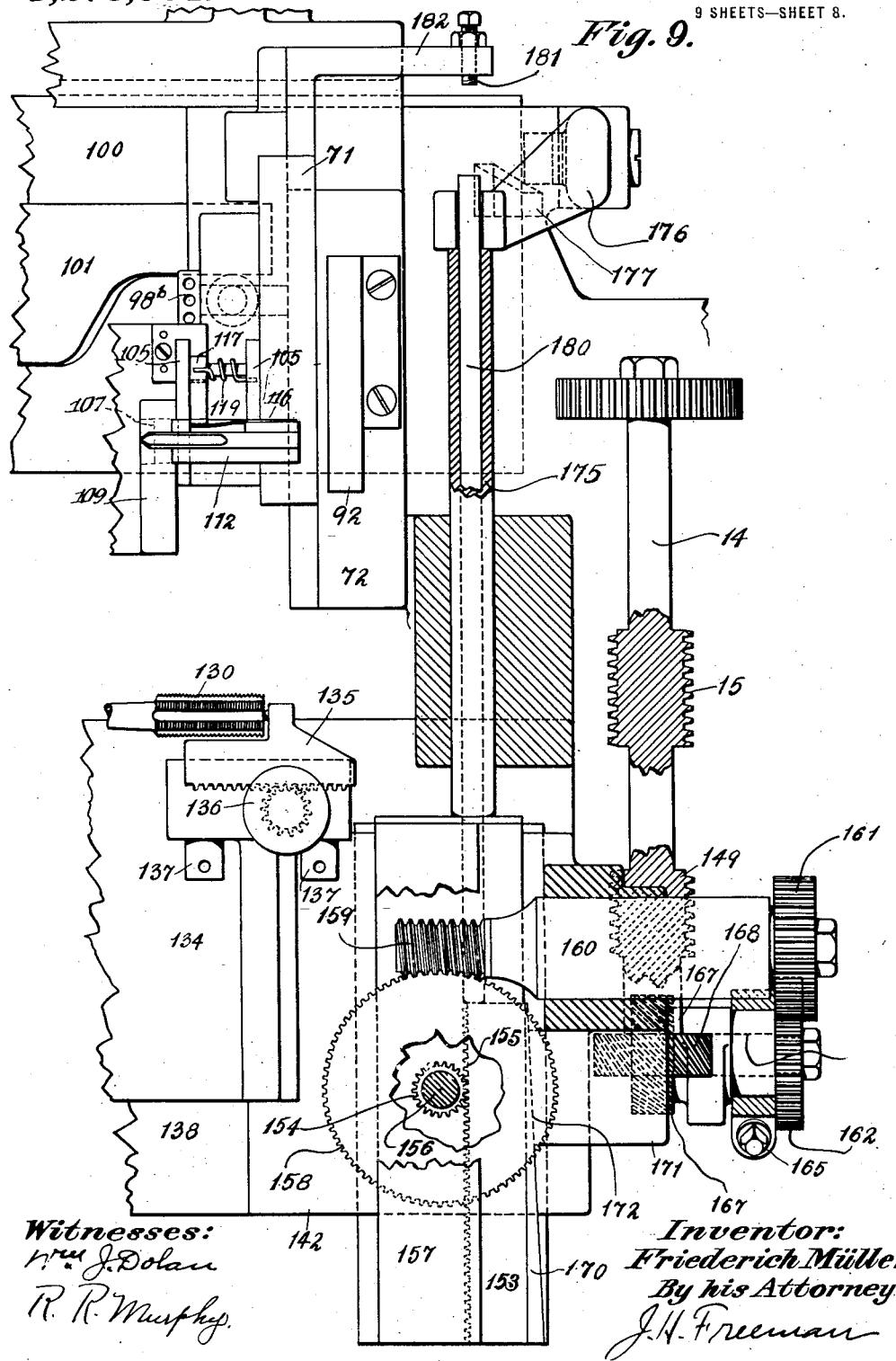

F. MULLER.
TAP MAKING MACHINE.
APPLICATION FILED FEB. 8, 1911. RENEWED OCT. 23, 1917.

1,273,904.

Patented July 30, 1918.
9 SHEETS—SHEET 9.

Fig. 10.

Witnesses:
Wm J. Dolan
R. R. Murphy

Inventor:
Friederich Müller
By his Attorney
J. H. Freeman

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

TAP-MAKING MACHINE.

1,273,904.     Specification of Letters Patent.     Patented July 30, 1918.

Application filed February 8, 1911, Serial No. 607,420. Renewed October 23, 1917. Serial No. 198,185.

*To all whom it may concern:*

Be it known that I, FRIEDERICH MÜLLER, a citizen of the United States, and a resident of Hartford, county of Hartford, State of Connecticut, have invented certain new and useful Improvements in Tap-Making Machines, of which the following is a specification.

In accordance with the invention I provide a complete organized mechanism for automatically milling a series of blanks in succession, so arranged that a blank is placed in the machine, completely milled during one revolution therein, discharged therefrom, and another substituted, and so on continuously so long as may be desired, without manual assistance.

One of the primary objects of the invention is to provide a machine for performing the various operations of presenting a blank to a suitable support, securing it in position, bringing into a predetermined operative relation the blank and a milling tool for simultaneously milling a plurality of thread convolutions on the blank, rotating the blank during the milling operation and simultaneously producing predetermined relative movement between the milling tool and the blank to give the desired pitch and form to the thread, then separating the milling tool and blank, releasing the latter, and establishing a predetermined initial relation between the milling tool and the blank support, these operations being performed automatically in continuous succession and with great accuracy. Other objects of the invention are to provide mechanisms for automatically or mechanically supplying the blanks to and locating them uniformly in a predetermined position with reference to the blank support, and then after the milling operation discharging them; also to provide for the maintenance of a very accurate and uniform relative movement between the milling tool and the blank support during the entire milling operation as required to produce a practically perfect thread; also to provide for a ready and accurate variation of the relative movement between the milling tool and blank support, whereby threads of various pitches may be produced; also to provide for effecting relative movements between the milling tool and the blank support to produce a predetermined "backing off" or relieving of the cutting edges of the completed trap; also to provide for insuring accuracy in establishing the initial relation between the blank and its support and between the milling tool and the blank support prior to the beginning of the milling operation; also to provide independent mechanisms for supplying the blank, establishing the initial relations between the blank and its support and between the blank support and the milling tool and for securing, releasing and discharging the blank, on the one hand, and, on the other hand, for rotating the blank and moving the milling tool with relation to the blank-support to give the thread the desired pitch and form; and also to provide for actuating these independent mechanisms intermittently and alternately in continuous succession, whereby the machine is rendered entirely automatic in operation. These and other objects of the invention will in part be obvious and in part be explained in the following description.

The invention consists in the novel improvements, devices, and combinations herein disclosed.

The accompanying drawings, wherein is illustrated one of the many possible embodiments of the invention, serve in connection with the description herein to explain the principles of the invention and one manner of carrying it into effect.

Of the drawings:

Figure 1 is a side elevation of a machine embodying my invention; Fig. 2 is a sectional top plan view of the same; Fig. 3 is an enlarged transverse section partly in elevation on an enlarged scale, the section being taken on the line 3—3 of Fig. 2; Fig. 4 is a similar view, the section being taken on the line 4—4, Fig. 2; Fig. 5 is a similar view, the section being taken on the line 5—5 of Fig. 2; Fig. 6 is a similar view, the section being taken on the line 6—6 of Fig. 2; Figs. 7 and 8 are views on a still larger scale, respectively illustrating the blank-supplying mechanism in two different positions; Figs. 8ª and 8ᵇ are enlarged perspective and plan views respectively of certain details of the blank-supplying mechanism; Fig. 9 is an enlarged fragmentary view, partly in plan and partly in horizontal section, of certain details of the machine; Fig. 10 is a fragmentary side elevation of the parts shown in Fig. 9 and of other details of the machine; Fig. 11 is a vertical section, illustrating a detail on a much enlarged scale; Fig. 12 is a fragmentary top plan view, partly in section, illustrating another form of cutter in use; Figs. 13 and 14 are views illustrating an alternate detail of construction; and Fig. 15 is a fragmentary sectional view illustrating a detail.

Referring now more particularly to the illustrated embodiment of the invention, it will be seen that the machine comprises a frame including the base 1, the uprights 2, and top plates 3 and 3$^a$.

As far as some features of the invention are concerned, any appropriate form of blank support may be employed. In the present embodiment the blank-support includes a spindle 4 and, a chuck 5 in which the shank end of the blank A is adapted to be positioned and clamped in a manner presently to be explained.

In carrying out one feature of the invention all or a plurality of the thread convolutions are simultaneously formed on the blank. While in some instances the blank may with advantage be rotated through more than a single revolution during the thread-forming operation, usually this operation may be completed during a single revolution of the blank, as in the illustrated embodiment. To this end the spindle 4 is journaled in bearings 6 suitably mounted on the frame and is connected to suitable actuating mechanism adapted to rotate the spindle through a single revolution and then bring it to rest. As shown, this actuating mechanism is arranged to be intermittently connected with a drive-shaft 7 (see Figs. 2 and 3) extending transversely of and suitably journaled upon the machine frame. This shaft is provided at one end with a drive-pulley 8. A pinion 9 is loosely sleeved on the shaft and is adapted to be intermittently connected therewith for the purpose of driving the spindle 4. Any suitable connection may be provided between the pinion and the spindle. Preferably, however, means are provided for varying the speed of the spindle with relation to the driving shaft to facilitate milling blanks of different sizes. To this end a gear 10, meshing with the pinion 9, is mounted on an arm 11 concentrically supported with relation to the shaft 7 and provided with a clamp 12 (see Fig. 1) by which it may be secured in various adjustments to enable the gear 10 to mesh with a gear 13 of any desired size on a shaft 14 which is provided with a worm 15 meshing with a worm wheel 16 fixed on the spindle 4. By substituting for the gears 13 other gear of different sizes, the speed of the spindle may be varied. The relative movements between the blank and the milling tool or cutter are controlled by mechanism actuated in unison with the rotation of the spindle, preferably by connections with the shaft 14, as will be hereinafter explained.

The mechanisms for supplying the blank, for positioning and securing the blank in its support, for separating the cutter and blank after the milling operation is completed, for releasing and discharging the blank, and for establishing a predetermined initial relation of the blank and cutter, or such of these mechanisms as may be employed, are actuated alternately with the blank-supporting spindle and preferably are driven by power and automatically controlled. In the illustrated embodiment these mechanisms are driven from the power shaft 7, means being provided whereby the actuating devices for these mechanisms are driven intermittently and alternately with the intermittent actuation of the spindle 4 and cutter-controlling devices. To this end the actuating means for the several mechanisms referred to comprises a shaft 17 (see Figs. 2 and 3), suitably journaled above the frame plate 3$^a$ in alinement with the drive shaft 7, a worm 18 fixed on the shaft 17 and a shaft 20 provided with suitable cams and with a worm wheel 19 arranged to mesh with the worm 18.

Any suitable means may be provided for intermittently and alternately connecting the drive shaft with the respective actuating means of the alternately operating sets of mechanisms. In the illustrated embodiment a double acting clutch member 21 is splined on the inner end of the drive shaft 7 and is adapted to coöperate, when moved in one direction, with a clutch member 22 on the gear 9, and, when moved in the other direction, with a clutch member 22$^a$ fixed on the shaft 17.

The mechanism for effecting automatic operation of the clutch-mechanism includes a rock shaft 23 suitably journaled above the top plate 3$^a$. Fast on one end of this shaft is a bifurcated clutch-shifting member 24 (see Figs. 3 and 4), the bifurcated ends of which are provided with studs or pins 25 adapted to project into a peripheral groove or channel in the clutch member 21, and whereby the latter is shifted upon the shaft 7 to effect its alternate engagement with one or another of the clutch members 22 and 22$^a$. Also fast on the rock shaft 23 is a shaft actuator 26 provided on its inner edge with two notches or depressions 26$^a$ and 26$^b$. Arranged in juxtaposition to the shaft actuator 26 and suitably fulcrumed on the plate 3$^a$ is a rocker member 27 formed with radiating upwardly and downwardly extending arms 28 and 29, and bored centrally to provide a chamber within which a plunger 30 and a push spring 31 are housed. To retain this spring 31 within the bore, a screw plug 32 is provided, as shown in Fig. 4. The plunger 30 is adapted to be seated by its spring in one or another of the notches or depressions in the shaft actuator 26.

In the embodiment illustrated the actuation of the rocker member 27 alternately in opposite directions is effected by parts respectively connected with the spindle 4 and the shaft 20. As shown in Figs. 1 and 4, said spindle and shaft are provided, respectively, with rocker-shifting cam members 33 and 34, which engage alternately with the arms 28 and 29 of the rocker member 27 and rock the same to position the plunger 30 in one or the other of the notches in the shaft actuator 26. The strength of the spring 31, pressing against the plunger 30, is sufficient to move the shaft actuator 26, when released as presently explained, and this in turn rocks the shaft 23 to shift the clutch-member 21 into engagement with one or the other of the clutch members 22 and 22ª for connecting and disconnecting the shafts 14 and 17 with the drive shaft 7.

To render positive and to time with accuracy the actuations of the clutch mechanism the rock shaft 23 is temporarily held in the position to which it may have been moved by the rocker member 27, and then released at the proper instants. To this end the rock shaft 23 is provided with upwardly and downwardly extending catch arms 35 and 36, adapted to be alternately engaged respectively by latches 37 and 38. These latches are fulcrumed intermediate their ends and are normally forced toward the clutch arms by a spring 39 connected at their outer ends. When the shaft actuator is operated by the plunger 30 to rock the shaft 23, the catch arms 35 and 36 will be moved so that one or the other will be engaged by the hooked end of its respective latch 37 or 38. The catches are operated to release the clutch actuator at predetermined points in the rotation of the actuating spindles or shafts 4 and 20. As shown, the spindle 4 is provided with a disk 40 carrying on its periphery a trip 41, adapted to operate the catch 37, and the shaft 20 is similarly provided with a disk 42 arranged in vertical alinement with the disk 40 and provided with a trip 43 adapted to operate the catch 38.

As the parts are shown in Fig. 4, the shaft 20 with its disk 42 is being rotated in the direction of the arrow, and the trip 43 is about to operate the catch 38. When this occurs, the rock shaft 23 will be released and moved by the spring plunger 30, which is now acting at the lower end of the actuator 26, and thus disengage the clutch 21 from the clutch 22ª and engage with the clutch 22. The actuating means comprising the shafts 17 and 20 will thus be disconnected from the drive shaft, and the actuating means comprising the shaft 14 spindle 4 will be connected with the drive shaft and set into operation. As the disk 40, which is connected with the spindle 4, begins its rotation, the trip 41 moves idly past the catch 37 and then the cam 33 will engage the arm 28 and move the rock member 27 so that the plunger 30 thereof will engage the recess 26ª in the shaft actuator 26. By the time this occurs, however, the catch arm 35 will be held by the catch 37 so that the clutch 21 will remain in engagement with the clutch 22. The cam 33 will therefore pass the arm 28, and the spindle 4 will continue to rotate until it has made a full revolution. The trip 41 will then operate the catch 37 and release the arm 35, whereupon the spring plunger 30 will rock the shaft 23 and disconnect the clutch 21 from the clutch 22 and reëngage it with the clutch 22ª. The actuating means comprising the shafts 17 and 20 will then be again connected with the driving shaft and will be driven through another cycle, as before. It will be seen therefore that this mechanism will operate to drive the two independent actuating mechanisms alternately in continuous succession. In a separate application for driving mechanism, Serial No. 198,058, filed October 23rd, 1917, as a division of the present case, I have set forth and claimed the driving mechanism which I have herein described. This driving mechanism therefore is not claimed as constituting by itself a part of the present invention.

Returning now to the means for supporting the blank during the milling operation, which will be presently described, means are preferably provided in addition to the chuck 5 to engage the end opposite that held by the chuck and thus prevent the blank from springing unduly under the action of the milling tool or cutter. In accordance with one feature of the invention, this means is also made use of to position the blank in a predetermined relation to the milling tool or cutter. In the illustrated embodiment (see Fig. 2) this positioning and supporting means comprises a tailstock 44 having a centering device 45 adapted to engage the end of the blank opposite that held by the chuck 5. This tailstock is in the form of a slide guided in a stationary support 46 to move toward and away from the longitudinally fixed spindle 4, the centering device 45 being located in the axial line of said spindle.

Since the milling tool or cutter, in the preferred form, or the supports therefor, must be located along one side of the blank and extend beyond the end thereof, it is necessary, in the preferred embodiment of the invention, to mount the tailstock at the opposite side of the blank, the centering device being arranged in an outwardly projecting or overhanging portion thereof. As with this arrangement the forces acting to move the tailstock into contact with the blank are not in line with the blank, there is apt to be a slight springing of the parts, when the tailstock is brought into engagement with the blank; and, if the tailstock is brought into contact with the blank with varying degrees of force, there will be corresponding varying degrees of spring and consequent variations in the sizes of the taps or similar articles operated upon by the cutter. To overcome this difficulty means is provided, in accordance with one feature of the invention, for causing the tailstock to bear upon the blank always with the same force so that, if any spring occurs, it will be uniform and will not cause variations in the product. To this end the following mechanism is employed for operating the tailstock slide 44: A second slide 47 (see Figs. 2 and 5) is mounted upon the support 46, and this slide 47 is connected with the slide 44 by a frictional connection adapted to exert a predetermined degree of force. As shown in Figs. 2 and 5, this frictional connection comprises a block 49 connected by a screw 48 with the slide 47, said block being provided with an opening in which is mounted a friction shoe 52, shown in Fig. 5, adjustable by means of a screw 53 to bear with the desired degree of pressure upon a rod 55 fixed in the tailstock 44. It will be seen that whenever the slide 47 is moved toward the work spindle 4, the slide 44 will be caused to move with it until the center comes in contact with the blank; and, the blank being held by the chuck, the friction shoe will then slip on the rod 55 but exert a predetermined force thereon. When the slide 47 is moved in the opposite direction, the tailstock will be withdrawn from the blank, and in order to reestablish the initial position between the two slides upon the return movement thereof a collar 56 is fixed on the rod 55 in position to engage a stop 54 fixed on the support 46.

For the purpose of firmly clamping the tail-stock, when it has been moved into contact with the blank with a force predetermined by the adjustment of the friction shoe 52, the following devices are provided: A gib 57 (see Figs. 2 and 11) forming a part of the guide for the tailstock 44, is provided with an eyebolt 58 which passes through the slide support 46 and is pivotally connected with a lever 59 which at one end is provided with a roller 60 (see Figs. 1 and 2) adapted to contact with a cam piece 61 fixed on the slide 47, this cam piece being so shaped that, as the slide 47 approaches the limit of its movement toward the blank, the lever will be actuated to force the gib against the tailstock 44 and thus firmly clamp it. For the purpose of adjusting the clamping pressure, the fulcrum of the lever 59 is formed by an adjusting screw 62, the point of which bears upon a suitable support, as the head of a second screw 63.

The slide 47 may be operated in any suitable way. As shown, the head of the screw 48 is extended to form a pivotal connection with the end of a lever 64 which, as shown in Fig. 1, is fulcrumed at an intermediate point 65 on the frame and is provided at its lower end with a roller 66 adapted to be engaged by suitable cams 67 and 68 upon a cam drum 69 fixed on the shaft 20.

In order that the tailstock may operate to position, as well as support, the blank, the cams are so formed as to give the tailstock a preliminary movement of predetermined length toward the blank-holding spindle, the tailstock being then stopped, while the blank is gripped by the chuck 5, as hereinafter explained. The slide 47 is then given a second movement in the same direction to make sure that the tailstock will bear with the force predetermined by the adjustment of the friction shoe against the end of the blank, this second movement of the slide 47 being continued until the tailstock is clamped by the operation of the lever 59 and the clamping devices connected therewith. Upon the return movement of the slide 47 the tailstock will first be released from the clamping devices and then returned to its initial position which is determined by the adjustment of the collar 56.

As the blank may have either a tapered and pointed end, as indicated in Figs. 2 and 9, or a flat end provided with a center hole, as indicated in Figs. 12, 13, and 14, the centering device 45 may be either provided with a center hole, in which the pointed end of the blank may be held, or the centering device may be provided with a point adapted to engage the center hole in the blank. Where the blanks are provided with center holes, it happens in practice that these center holes vary in size or depth in the different blanks. In order that the blanks may be properly centered notwithstanding these variations in the center holes, means other than the pointed centering devices may be provided to engage the end of the blank to adjust its position, the centering device being then moved into engagement with the hole with a predetermined force, as above explained, after the blank is gripped in the chuck. One form of this centering means is illustrated in Figs. 13 and 14. Referring to Fig. 13, it will be seen that the pointed centering device $45^a$ is provided with a bore at one side of the point in which is located a small plunger $45^b$, which is normally pressed outward by a spring $45^c$ so that its end engages the blank adjacent the center hole. As long as the blank is not gripped in the chuck the force of this spring is sufficient to move the blank, this operation taking place upon the first movement of the slide 47. After the blank has been gripped in the chuck the second movement of the slide 47 will overcome the force of the spring 45ᶜ and cause the point of the centering device to enter the centering hole in the blank and bear thereon with a pressure predetermined by the friction shoe 52, as previously explained, this position of the parts being illustrated in Fig. 14.

Having now described the blank-supporting means and the actuating and controlling devices therefor, the mechanism for supplying and discharging the blanks will be described. In the embodiment of the invention illustrated (see Figs. 1, 7, 8, 8ᵃ and 8ᵇ) the mechanism for supplying blanks to the blank-holder includes a magazine 70 mounted on a slide 71 arranged in a guideway 72 fixed on the frame. The magazine includes an angular upright or standard 73, one portion 74 thereof forming a side section and another portion 75 forming an end section of the magazine. The opposite end section of the magazine comprises an angular plate 76 adjustably secured to the portion 74 of the upright to adapt the magazine to accommodate blanks of different lengths.

Adjustably mounted on the inner face of the end portion 75 is an angular plate 78. The angular plate 76 is provided with two plates 79 and 80 relatively adjustable by means, respectively, of the adjusting screws 81 and 82 threaded through the angular plate 76 and an angle bracket 77 secured to the plate 76. The plates 78, 79, and 80 are made adjustable to provide a channel or runway 83 adapted to accommodate different sized blanks.

As shown in Figs. 7 and 8, the blanks A occupy a position in the magazine parallel to the longitudinal axis of the spindle 4. To effect a proper delivery of a single blank at a time, a suitable controlling mechanism is provided. The preferred embodiment of this mechanism includes a shaft 84 journaled in the upright 73 near the bottom of the magazine. Fast on said shaft is an arm 85. Arranged in juxtaposition to said arm 85 and loose on said shaft is an angle lever 86. Extending through the ends of the arm 85 and the lever 86 is a T-headed pin 87 which is encircled by a compression spring 88 confined between the said ends. Also fast on said shaft 84 is an arm 89 which rocks the shaft and through the arm 85 and spring 88 rocks the lever 86 which is loose upon the shaft 84. The lower branch of this lever 86 is provided with fingers 90 and 91, which, by reason of the spring 88, are yieldingly thrust between the blanks in the channel when the shaft 84 is rocked in one direction, the finger 90 being projected between the fluted portions and the finger 91 between the shanks of the two lowermost blanks, thereby separating and slightly lifting the blanks within the magazine. By this means the descent of the blanks in the blank channel of the magazine is controlled, so that but one blank can be delivered therefrom at a time.

In order to actuate the arm 89 to perform the function just described, a cam block 92 is fixed on the guideway 72. The cam block 92 is provided with a horizontal face 93, a downwardly sloping face 94, and a second horizontal face 95. It will be understood that the cam block is stationary, while the magazine moves, and that when the lever 89 is resting on the ineffective face 93, the fingers 90 and 91 will project into the blank channel and support the blanks therein. As the magazine moves toward the spindle 4 and carries with it the arm 89, the end of said arm traverses the inclined face of the cam block and turns the shaft 84 either by the weight of the arm or by spring 89ᵃ (see Fig. 1) to actuate the arm 85, which through the T-headed pin 87 rocks the angle lever 86 and withdraws the fingers from the blank channel to the positions shown in Fig. 8. As the magazine is moved away from the spindle 4, the arm 89 again traverses the inclined face of the cam block and thereby effects a rocking of the shaft 84 which in turn moves the arm 85, and this through the spring 88 transfers its movement yieldingly to the angle lever 86 and again yieldingly positions the blank-engaging fingers in the blank channel of the magazine.

The movement of the magazine is accomplished in the following manner: Upon the lower portion of the magazine support 71 a depending block 96 is adjustably secured by a projection 97, adjusting screws 98 and 98ᵃ, and clamp screw 98ᵇ, to regulate the extent of movement of the said support. The block 96 is provided with an antifriction roller 99 (see Fig. 6) which occupies a position below the plane of the top plate 3 of the machine. Arranged in juxtaposition to said antifriction roller 99 is a cam drum 100 (Fig. 6) provided with cams 101 and 101ᵃ. The cam drum is fast on a transverse shaft 102 suitably journaled in the frame work of the machine and driven from the shaft 20 by bevel gears 103 and 104.

To receive a blank from the magazine and transfer it to the blank-supporting means, a blank carrier is provided and actuated as follows: As shown, the blank carrier comprises a segmental member 105 (see Figs. 7 and 8) pivoted upon the slide 71 immediately beneath the magazine. The segmental member is operated by a depending arm carrying an antifriction roller 107 adapted to travel in a cam groove 108 formed in a block 109 fixed on the machine frame. The segmental member 105 is provided with a transverse groove in which is located a blank carrier member 112 (see Fig. 8ᵃ) having a recess of a size and shape adapted to hold the blanks A. This member 112 is made detachable, being normally retained by a screw 113 in order that it may be removed and replaced by similar members having recesses suitable for blanks of different sizes.

For the purpose of positioning the blanks in predetermined relation to the blank carrier, thereby enabling the latter to deliver the blanks in predetermined position with relation to the blank support and cutter, the carrier member is recessed at one side, as shown in Fig. 8ª, and means are provided acting through this recess to engage the blank in such a way as to position it in the carrier member. As shown, a spring detent 116 is fixed on the carrier member, said detent tending normally to remain in a retracted position to permit the blank to enter the carrier, when the latter is in position under the magazine, as shown in Fig. 7. As the carrier moves from its blank-receiving position to the blank-delivering position shown in Fig. 8, means are provided for actuating the detent to position the blank and retain it in the carrier to prevent accidental displacement. As shown, a lever 117 is fulcrumed on the segmental member 105 with one end adjacent to the detent 116 and the other end depending in a position to strike a stationary cam block 118 fixed on the frame in the position indicated in dotted lines in Fig. 7. The lever is normally pressed toward the detent spring 116 by spring 119 which has sufficient force to overcome the detent spring.

The cam groove 108 is so formed and located that, when the slide 71 is in its retracted position, the carrier 112 is in position to receive the lowermost blank which is separated from the remaining blanks in the magazine. When the slide 71 is advanced, the segment 105 will first be rotated through an arc of about ninety degrees to bring the blank into the axial plane of the spindle 4 and then advanced until the blank is brought into axial alinement with the spindle, as shown in Fig. 8. As soon as the segment starts from the position shown in Fig. 7, the lever 117 is released and the spring 119 moves the detent 116 into contact with the flat portion of the blank to position the blank in the holder and prevent accidental displacement thereof. When the blanks in the magazine are released by the fingers 91 during the forward motion of the parts, they drop down so that the lowermost blank rests upon the concentric surface of the segment 105 and is retained thereby in position to drop into the carrier member 112, when the segment returns to normal position. When the carrier is in the position shown in Fig. 8 the blank is engaged by the tailstock and by the chuck in the manner already explained. As the carrier is returned to the position shown in Fig. 7 the blank is drawn out, being retained by the said tailstock and chuck.

In a separate application for magazine mechanism, Serial No. 198,056, filed October 23rd, 1917, as a division of the present case, I have set forth and claimed the magazine mechanism which I have herein described. This magazine mechanism therefore is not claimed as constituting by itself a part of the present invention.

The blank having been positioned within the chuck 5, the latter is operated to grip the blank in any suitable manner. As shown, the chuck is connected to a sleeve 120 (see Fig. 2) arranged within the hollow spindle 4 and this sleeve projects to a point near the rear end of the spindle where it is engaged by levers 121 pivoted on an extension of the spindle and actuated by a sliding cone 122. This cone is actuated at the proper times to grip and release the blank by cams 123 and 124 (see also Fig. 1) on a cam drum 125 fixed on the shaft 20. After the blank is released it may be ejected by any suitable means, as by an ejector rod 126 arranged within the sleeve 120 and projecting beyond the rear end of the spindle, where it is provided with a collar 127 adapted to be actuated through suitable connections by cams 128 and 129 on the drum 125.

The mechanism for milling the blank and for producing the required relative movements between the milling cutter and the blank will now be described. For the purpose of forming threads upon the blank there is provided a milling tool or cutter which is adapted to cut a plurality of thread convolutions or grooves simultaneously, and means is provided for effecting during each revolution of the blank a relative movement between the cutter and the blank endwise or in the direction of the axis of the blank through a distance equal to the pitch of the thread, this distance being also the pitch of the groove-forming projections upon the milling tool. It will be understood that cutters of various pitches will be required to cut threads of various pitches and that the relative movement between the cutter and blank will have to be varied according to the pitch of the cutter and of the thread to be formed thereby. It is also desirable that the threads cut upon the blank should be slightly relieved or "backed off." This is accomplished by effecting a relative movement between the cutter and blank in a direction transverse to the axis of the blank, this movement being a reciprocatory one, the number of reciprocations corresponding to the number of longitudinal cutting edges or "lands" on the tap blank.

As shown in Figs. 2 and 9, the milling cutter 130 is provided with a series of groove cutting points or teeth having a pitch corresponding to that of the tap to be threaded, the cutter being of sufficient length to cut all the threads on the blank during one revolution of the blank. It will be understood that the cutting teeth on the cutter are arranged in circumferential lines without any lead or spirality and that the cutter is to be continuously rotated at a proper cutting speed. As shown, the cutter 130 is mounted on a spindle 131 which is journaled in suitable bearings 132 and 133 upon a cutter support 134. The spindle is continuously driven in any suitable way, as by a shaft 131ª having a driving pulley 132ª, this shaft and pulley being suitably mounted upon the main frame and connected with the cutter spindle by suitable flexible connections adapted to accommodate the necessary movements of the cutter with relation to the blank. The end of the cutter opposite the spindle 131 may be supported and steadied by a center rest 135 mounted upon the support 134 and adapted to be moved into contact with the cutter and secured in any suitable way, as by the rack and pinion adjusting means 136 and the capstan clamp screws 137.

For the purpose of bringing the cutter into proper alinement and adjustment with relation to a given size of blank, the support 134 is mounted to slide transversely to the axis of the blank upon a plate 138, as shown in Fig. 6, and these parts are connected by a screw 139 having a hand wheel 140 by which the slide 134 may be adjusted to cause the cutter to penetrate the blank to the required depth. When the proper adjustment has been effected, the slide may be firmly secured by a clamp screw 140ª. For the purpose of bringing the cutter into accurate parallel relation with the blank, the plate 138 is pivotally mounted upon a second plate 141, the pivotal axis being vertical so that the axis of the cutter may be swung in the plane of the axis of the blank to bring the two axes into parallel relation.

For the purpose of reciprocating the cutter in the direction transverse to the axis of the blank to perform the backing off operation, the plate 141 is arranged to slide in a direction transverse to the axis of the blank upon a carriage 142 which in turn is guided in the top plate 3 of the machine to move in a direction parallel to the axis of the blank for a purpose presently to be explained. The reciprocatory movement of the plate 141 may be produced in various ways. In the construction shown a lever 143 is pivoted in an opening in the carriage 142 at a point close to the plate 141 and is provided with a short arm adapted to engage the said plate. In order that the extent of the vibratory movement may be varied means are provided for varying the effective length of the short arm of the lever. As shown, a movable abutment 141ª (see Fig. 15) is mounted on the plate 141, a screw 141ᵇ being provided to move and control the position of the abutment. The lever 143 is provided with a depending relatively long arm which is operated through a relatively great distance by a cam 144 fixed on a shaft 145, the cam being arranged to move the lower end of the lever outward and thus cause the short arm of the lever to move the plate 143 and the milling tool carried thereby through a relatively short distance inward toward the blank. As shown, the cam is provided with a notch 146 so that at the end of each revolution of the cam the parts are permitted to return, this movement being effected by a spring 147 arranged between the carriage 142 and the plate 141, as clearly shown in Fig. 6. It will be seen that by this mechanism provision is made to move the carriage in a direction transverse to the axis of the blank through minute and very accurately determined distances, as required to effect the slight relieving of the threads cut on the blank. It will be understood that the shaft 145 must be given a single revolution for each cutting edge or "land" of the blank. To this end, the shaft 145, which is mounted in suitable bearings beneath the carriage 142 and is extended to a point beneath the shaft 14, is provided with a worm wheel 148 (see also Fig. 3) which meshes with a worm 149 on the shaft 14. It will be understood that the proportions of this worm and worm wheel are so determined with relation to the worm 15 and worm wheel 16 by which the spindle 4 is rotated that the shaft 145 will be driven one revolution for each of the lands on the tap blank.

In order that the milling tool may be moved away from the tap blank at the end of the milling operation so as to permit the threaded blank to be discharged and an unthreaded blank to be positioned in the blank-supporting means, provision is made for retracting the cutter support at the end of each rotation of the blank. This may be accomplished in various ways. As shown, the notch 146 in the cam 144 is made deep and the lever 143 is provided with a projection 149ª which enters this notch far enough to permit of the movement required to separate the cutter from the blank, it being understood that the cam will be so positioned or timed that, when the blank-carrying spindle is stopped, the cam will be stopped with its notch 146 opposite the projection on the lever. To prevent the projection on the lever 143 from entering the notch 146 upon each revolution of the cam 144, means are provided for controlling the lever 143 during the period of operation of the cam 144, said means serving to effect the separation of the cutter and blank, as permitted by the notch 146, when the cam 144 is stationary. As shown, an adjustable abutment 150 (see Fig. 6) is normally so located as to engage the free end of the lever 143 and prevent the projection thereon from entering the notch 146. This abutment is connected with a rod 151 suitably mounted in the frame and arranged to engage a cam 152 on the end face of the cam drum 100. This cam is so located that, when the drum is at rest, the abutment 150 will be in operative relation to the lever 143. When the work-carrying spindle and the cam 144 stop and the actuating shaft 20 is started, the cam 152 immediately releases the abutment 150 and the lever 143 so as to permit the cutter to move away from the blank under the influence of the spring 147. Just before the actuating shaft 20 completes its revolution, the cam 152 again comes into operation to move the abutment 150 back to its normal position and thus establish a predetermined initial relation between the cutter and the blank in a direction transverse to the axis thereof, this blank being a new blank which has in the meantime been introduced into the blank-supporting means.

So far as certain features of the invention are concerned, any suitable means may be provided for effecting a relative movement between the cutter and the blank or between the cutter support and the blank support in the direction of the axis of the blank, as required to give the proper pitch to the thread. In accordance with one feature of the invention, however, the means for effecting this relative movement is constructed to make certain that the relative movement will be under way and maintained with uniformity and accuracy during the entire thread forming operation so that the pitch of the thread will be uniform throughout. The construction of the said means is such, also, that the operation thereof may be regulated to produce threads of different pitches with great accuracy and facility. These means comprise a member for effecting the relative movement between the cutter and blank supports, which member is moved, preferably through a relatively great distance to produce a proportionately small movement of one of the supports with relation to the other, by one train of mechanism and is then disconnected and returned to its normal position by independent means or a second train of mechanism, the first train being constructed to move the member at the required low rate of speed in unison with rotation of the blank and with great accuracy, and the second train of mechanism being adapted to return the member, preferably with a relatively quick motion to its starting position after the completion of the thread forming operation or while the blank rotating means is at rest.

In the embodiment illustrated the relative movement between the cutter and blank supports is effected by moving the cutter support with relation to the blank support, the member for effecting this movement being in the form of a slide 153 (see Fig. 9) arranged to move transversely to the carriage 142 upon which the cutter support is mounted. This slide is actuated in one direction by a pinion 154 (see Figs. 2 and 9), arranged to mesh with a rack 155 on the slide 153, said pinion being fixed on a shaft 156 suitably journaled in a secondary slide 157 mounted on the carriage 142. Fixed on the shaft 156 is a worm wheel 158 which normally engages a worm 159 fixed on a shaft journaled in a bearing sleeve 160 fixed on the frame. Means is provided for driving the worm 159 at different speeds with relation to the rotation of the blank-carrying spindle 4 for producing threads of different pitches. As shown, (see Fig. 3) the shaft of the worm 159 is provided with a gear 161 adapted to mesh with a gear 162 journaled on an arm 163 mounted concentrically with a shaft 164 and adapted to be secured in various adjustments with relation thereto by a clamp 165. The shaft 164 has fixed thereon a gear 166 adapted to mesh with the gear 162 and a spiral gear 167 arranged to mesh with a corresponding spiral gear 168 on the shaft 14. By substituting for the gear 161 other gears of different sizes and adjusting the arm 163 to bring the gear 162 into mesh with such substituted gears, the worm 159 may be driven at any desired speed with relation to the revolution of the blank-carrying spindle 4. If desired, the speed of the worm 159 may be varied through a still wider range by substituting for the gears 162 and 166 other gears having different relative proportions. In this way the slide 153 may be moved through any desired distance during a single revolution of the blank-carrying spindle. In any case the motion of the slide 153 will be relatively great, as compared with the movement which is to be imparted thereby to the carriage 142. The relatively great longitudinal movement of the slide 153 is converted into the relatively slight movement of the carriage 142 by any suitable means. As shown, a wedge 170 is formed on or secured to one side of the slide 153 and this wedge is adapted to coöperate with a suitable stationary abutment 171 having an inclined face 172 against which the wedge 170 bears. It will be seen that with a given proportion of the gears connecting the worm 159 with the shaft 14, the slide 153 will be moved through a given distance during a single revolution of the blank-carrying spindle the movement being uniform and continued throughout the revolution of the blank, thus causing a given movement of the carriage 142 and producing a given pitch of the thread formed by the cutter upon the blank, it being understood that the pitch of the cutter teeth is equal to that of the thread.

After the thread on one blank has been completed, the cutter must be separated from the blank and returned to its initial position with relation to the blank-support to begin its operation on the next blank. This may be accomplished in various ways. In the embodiment shown, the slide 153 must be returned to its starting position before the carriage 142 can be moved back to establish the initial relation of the cutter and the blank support in the direction of the axis of the blank. In order to return the slide 153 to its starting position, the driving connection between it and the shaft 14 must be released. As shown, this driving connection is released by moving the worm wheel 158 out of mesh with the worm 159. To this end, the shaft 156 carrying the worm wheel 158 and pinion 154 is mounted in the slide 157 which is normally pressed inward by a spring 173 arranged between a bracket 174 and the slide 157, as shown in Fig. 2. This spring tends constantly to keep the worm wheel 158 in mesh with the worm 159. The separation of these parts after the completion of the blank-threading operation may be effected by any suitable connection with the actuating shaft 20. As shown, a sleeve 175 is arranged between the slide 157 and the end of a lever 176 fulcrumed at the opposite side of the machine, as shown in Figs. 1 and 9, the opposite end of the lever being arranged in the path of a cam 177 on the cam drum 100. This cam is so timed that as soon as the shaft 20 begins its revolution, the lever will be operated to disconnect the worm 159 and worm wheel. The wedge-carrying slide 153 will then be free to return to its starting position and this may be accomplished by any suitable connections with the actuating shaft 20. As shown, a rod 180 is arranged to slide within the sleeve 175 and to engage at one end with the slide 153 and to be engaged at the other end by an adjusting screw 181 mounted in an arm 182 connected with the slide 71 which carries the magazine of the blank-supplying mechanism, as clearly shown in Fig. 9. It follows that when the magazine is actuated to deliver a blank to the blank-carrying spindle, the rod 180 will also be actuated to return the slide 153 to its starting position.

The carriage 142 is now free to be returned to its initial position. This may be accomplished in various ways. As shown, the carriage 142 is provided with a depending arm 183 (see Fig. 10) having at its end an antifriction roller adapted to be engaged by a cam 184 on the cam drum 69 by which the tailstock is operated, as previously described.

It will be seen that the carriage 142 must begin its forward movement simultaneously with the beginning of the thread-cutting operation, otherwise the pitch of the thread will be faulty. It will also be seen that unless the carriage 142 is fully returned so that the wedge 170 bears upon the abutment surface 172 without any chance for lost motion and always with substantially the same pressure, the beginning of the motion of the carriage 142 will not be uniform with relation to the beginning of the motion of the blank-carrying spindle. The complete return of the carriage to its initial position with substantially the same initial pressure between the wedge and abutment, may be insured in various ways, as by providing yielding connections between the actuating means and the carriage. As shown, the cam 184 is constructed to exert a predetermined pressure upon the arm 183 of the carriage. To this end, the cam 184 is pivoted near its advanced end and is pressed in the direction of the motion of the carriage 142 by a coiled spring 185 confined, preferably with a predetermined initial compression, between the free end of the cam 184 and the plate 186 upon which said cam is pivoted. In order that the operation of the cam may be further and nicely adjusted, the arm 183 may be adjusted with relation to the carriage 142 by an adjusting screw 187, as shown in Fig. 10, the arm being clamped in its adjusted position by a clamp bolt 188.

The operation of the various parts of the machine having been described in connection with the construction thereof, it only remains to state briefly how the various parts coöperate to produce the desired result. Starting for convenience at the point when the threading of a tap blank has just been completed and the blank-supporting spindle 4 has just finished its rotation, it will be remembered that at this instant the actuating shaft 20 will be set in motion. The rotation of this shaft and the cams connected therewith brings about the following operations substantially in the order stated: The cutter and tailstock are moved away from the blank, the chuck 5 releases the blank and the ejector 126 insures the discharge of the blank from the chuck, whence it drops out of the machine. The blank-supplying means then operates to aline another blank axially with the spindle 4, the tailstock advances through the first step of its motion and positions the blank in the chuck, the blank being steadied during this operation and prevented from moving too far by the ejector rod 126. The chuck is then operated to grip the blank whereupon the tailstock is again pressed toward the blank and caused to bear thereupon with a predetermined pressure by reason of the frictional connections previously described and then is firmly clamped in this position by the action of the lever 59 and cam 61. In the meantime the cutter carriage actuating slide 153 has been released from its driving connections with the spindle 4, moved back to its starting position and resecured to its driving connections, the cutter carriage returned to its initial position and finally the cuttter brought back into its initial relation with the blank support ready to begin the milling of the new blank. By this time the actuating shaft 20 has completed its rotation and stopped. The actuating shaft 14 then starts to rotate the blank and effects the movements of the cutter both in the direction of the axis of the blank and in the transverse direction, as required to form and relieve the thread on the new blank. These operations are repeated in continuous succession, where the two actuating means typified by the shafts 14 and 20 are driven by power and automatically controlled, as in the embodiment illustrated, no attention being required from the operator except to keep the magazine supplied with blanks and to test the product of the machine from time to time to see that the machine is properly performing its functions.

While the embodiment of the invention illustrated is particularly adapted for performing the operation of threading tap blanks, the invention may, as to some of its features be applied to machines for performing other operations upon tap blanks and similar operations upon other articles, as will be obvious to those skilled in the art. In addition to threading tap blanks the embodiment of the invention illustrated has been successfully employed, for instance, for tapering the ends of taps. The only changes required to perform this operation are to substitute a suitable form of milling tool or cutter, such as that illustrated at 190 in Fig. 12, for the form of cutter previously described and render inoperative the mechanism for moving the cutter carriage in the direction of the axis of the blank. The machine will then operate to taper the ends of the taps, the tapered surface formed on each land being relieved or backed off just as the threads were relieved or backed off in the thread-forming operation.

It is to be understood therefore that the invention in its broader aspects is not confined to the particular constructions herein shown and described nor to any particular construction by which it has been or may be carried into effect, as numerous changes may be made without departing from the main principles of the invention and without sacrificing its chief advantages.

What I claim is:

1. The combination of means for supporting a blank, means for cutting the blank, mechanism for rotating the blank during the cutting operation and for simultaneously causing relative movement between the cutting means and the blank support, mechanism for successively supplying blanks to the blank support, and means for automatically actuating said mechanisms alternately in continuous succession.

2. The combination of means for supporting a blank, means for cutting the blank, mechanism for rotating the blank during the cutting operation and for simultaneously causing relative movement between the cutting means and the blank support, mechanism for successively supplying blanks to the blank support and for establishing a predetermined initial relation between the cutting means and each blank, and means for automatically actuating said mechanism alternately in continuous succession.

3. The combination of means for supporting a blank, means for cutting the blank, mechanism for rotating the blank during said cutting operation and for simultaneously causing relative movement between the cutting means and the blank support, mechanism for successively supplying blanks to and for securing them in and for releasing them from the supporting means, and means for automatically actuating said mechanism alternately in continuous succession.

4. The combination of means for supporting a blank, means for cutting the blank, mechanism for rotating the blank during said cutting operation and for simultaneously causing relative movement between the cutting means and the blank support, mechanism for supplying the blanks to and securing them in and releasing them from the supporting means and for establishing a predetermined initial relation between the cutting means and each blank, and means for automatically actuating said mechanisms alternately in continuous succession.

5. The combination of means for supporting a blank, means for cutting the blank, mechanism for rotating the blank during the cutting operation and for simultaneously causing relative endwise movement between the cutting means and the blank support, mechanism for successively supplying blanks to the blank support, and means for automatically actuating said mechanisms alternately in continuous succession.

6. The combination of means for supporting a blank, means for cutting the blank, mechanism for rotating the blank during the cutting operation and for simultaneously causing relative reciprocatory relieving movements between the cutting means and the blank support, mechanism for successively supplying blanks to the blank support, and means for automatically actuating said mechanisms alternately in continuous succession.

7. A machine for threading taps and the like including in combination, means for supporting a grooved blank, means for simultaneously cutting a plurality of thread convolutions on the blank, mechanism for rotating the blank during the cutting operation and for simultaneously causing relative movement between the cutting means and the blank support, mechanism for successively supplying the blanks to and securing them in the supporting means with their grooves in a predetermined relation to the cutting means, and means for automatically actuating said mechanisms alternately in continuous succession.

8. A machine for milling taps and the like including in combination, means for supporting a blank, means for milling the blank, mechanism for rotating the blank and for causing relative movement between the milling tool and the blank during the milling operation, mechanism for successively supplying blanks to the blank support and for establishing a predetermined initial relation between the milling tool and the blank support, and means for automatically actuating said mechanisms alternately in continuous succession.

9. The combination of means for supporting a blank, means for cutting the blank, mechanism for rotating the blank during the cutting operation and for causing a relative movement between the cutting means and the blank support, mechanism for successively supplying blanks to the blank support, actuating means for each of said mechanisms, driving means, and means rendered operative by each actuating means for disconnecting said actuating means from the driving means and connecting the other actuating means with said driving means.

10. The combination of means for supporting a blank, means for cutting the blank, mechanism for rotating the blank during the cutting operation and for causing a relative movement between the cutting means and the blank support, mechanism for successively supplying blanks to the blank support and for establishing a predetermined initial relation between the cutting means and the blank support, actuating means for each of said mechanisms, driving means, and means rendered operative by each actuating means for disconnecting said actuating means from the driving means and connecting the other actuating means with said driving means.

11. A machine for milling taps and the like including in combination, means for supporting a blank, means for milling the blank, mechanism for rotating the blank and for causing relative movement between the milling tool and the blank during the milling operation, mechanism for successively supplying blanks to the blank support and for establishing a predetermined initial relation between the milling tool and the blank support, an actuating means for each of said mechanisms, a driving means, and means rendered operative by each actuating means for disconnecting said actuating means from the driving means and connecting the other actuating means to the driving means.

12. The combination of means for supporting a blank, means for milling the blank, mechanism for rotating the blank and causing relative movement between the milling tool and the blank during the milling operation, mechanism for successively securing the blanks in the blank support, actuating means for each of said mechanisms, driving means, and means rendered operative by one actuating means for releasing said actuating means from the driving means and connecting the other actuating means with the driving means, said connecting means being normally locked by the actuating means then in control of it.

13. The combination of means for supporting and rotating a blank, a rotating cutter, means for bringing the cutter and the blank into predetermined coöperative relation prior to the rotation of the blank, means for effecting reciprocatory relieving movements between the cutter and the blank in timed relation to the rotation of the blank, and means for stopping the rotative blank movement with the blank approximately in its initial angular position.

14. The combination of means for supporting and rotating a longitudinally grooved blank, means whereby the blank may be positioned with the grooves in predetermined angular positions, a rotating cutter, means for bringing the cutter and the blank into predetermined coöperative relation prior to the rotation of the blank, means for effecting a reciprocatory relieving movement between the cutter and the blank for each groove of the blank as the blank is rotated, and means for stopping the rotative blank movement with the blank approximately in its initial angular position.

15. The combination of means for supporting and rotating a longitudinally grooved blank, a rotating cutter, means whereby the blank may be positioned with one of the grooves opposite the cutter, means for bringing the cutter and the blank into predetermined coöperative relation prior to the rotation of the blank, means for effecting a reciprocatory relieving movement between the cutter and the blank for each groove of the blank as the blank is rotated, and means for stopping the rotative blank movement with the blank approximately in its initial angular position.

16. The combination of means for supporting and rotating a blank, a rotating cutter, means for bringing the cutter and the blank into predetermined coöperative relation prior to the rotation of the blank, means for effecting reciprocatory relieving movements between the cutter and the blank in timed relation to the rotation of the blank, means for stopping the rotative blank movement with the blank approximately in its initial angular position, and means for separating the cutter and the blank after the rotation of the blank has ceased.

17. The combination of means for supporting and rotating a blank, a rotating cutter, means for bringing the cutter and the blank into predetermined coöperative relation prior to the rotation of the blank, means for effecting reciprocatory relieving movements between the cutter and the blank in timed relation to the rotation of the blank and means for stopping the rotative blank movement after a single revolution.

18. The combination of means for supporting and rotating a blank, a rotating cutter, means for bringing the cutter and the blank into predetermined coöperative relation prior to the rotation of the blank, means for reciprocating the cutter in timed relation to the rotation of the blank to effect relieving, and means for stopping the rotative blank movement with the blank approximately in its initial angular position.

19. The combination of means for supporting and rotating a blank, a rotating cutter, means for moving the cutter into predetermined coöperative relation with the blank prior to the rotation of the blank, means for effecting reciprocatory relieving movements between the cutter and the blank in timed relation to the rotation of the blank, and means for stopping the rotative blank movement with the blank approximately in its initial angular position.

20. A machine for threading taps and the like including in combination, means for supporting a blank, means for rotating the blank through a single revolution, means for cutting a plurality of thread convolutions on the blank during its revolution, means for bringing the blank and cutter into predetermined coöperative relation prior to the rotation of the blank, and means for effecting a predetermined number of reciprocatory movements between the cutter and the blank in a direction transverse to the axis of the blank during the revolution of the blank.

21. A machine for threading taps and the like including in combination, means for supporting and rotating a blank, a rotating cutter for simultaneously cutting a plurality of thread convolutions on the blank as it rotates, means for bringing the blank and the cutter into predetermined coöperative relation prior to the rotation of the blank, means for effecting during a single revolution a relative endwise movement between the blank and the cutter equal to the pitch of the thread, means for effecting reciprocatory relieving movements between the cutter and the blank in timed relation to the rotation of the blank, and means for stopping the rotative blank movement with the blank approximately in its initial angular position.

22. A machine for threading taps and the like including in combination, means for supporting and rotating a longitudinally grooved blank, means whereby the blank may be positioned with the grooves in predetermined angular positions, a rotating cutter for simultaneously cutting a plurality of thread convolutions on the blank as it rotates, means for bringing the blank and the cutter into predetermined coöperative relation prior to the rotation of the blank, means for effecting during a single revolution a relative endwise movement between the blank and the cutter equal to the pitch of the thread, means for effecting a reciprocatory relieving movement between the cutter and the blank for each groove of the blank as the blank rotates, and means for stopping the rotative blank movement with the blank approximately in its initial angular position.

23. A machine for threading taps and the like including in combination, means for supporting and rotating a blank, a rotating cutter for simultaneously cutting a plurality of thread convolutions on the blank as it rotates, means for bringing the blank and the cutter into predetermined coöperative relation prior to the rotation of the blank, means for effecting during a single revolution a relative endwise movement between the blank and the cutter equal to the pitch of the thread, means for effecting reciprocatory relieving movements between the cutter and the blank in timed relation to the rotation of the blank, and means for stopping the rotative blank movement after a single revolution.

24. A machine for threading taps and the like including in combination, means for supporting a blank, means for rotating the blank through a single revolution, means for simultaneously cutting a plurality of thread convolutions on the blank during its revolution, means for bringing the blank and the cutter into predetermined coöperative relation prior to the rotation of the blank, means for effecting a relative movement between the blank support and the cutter in the direction of the axis of the blank equal to the pitch of the thread during the revolution of the blank, means for effecting a predetermined number of reciprocatory movements between the blank support and the cutter in a direction transverse to the axis of the blank during the rotation of the blank, and means for separating the blank support and the cutter after the rotation of the blank has ceased.

25. A machine for threading taps and the like including in combination, means for supporting and rotating a blank, a rotating cutter for simultaneously cutting a plurality of thread convolutions on the blank as it rotates, means for bringing the blank and the cutter into predetermined coöperative relation prior to the rotation of the blank, means for moving the cutter endwise during a single revolution a distance equal to the pitch of the thread, means for effecting reciprocatory relieving movements between the cutter and the blank in timed relation to the rotation of the blank, and means for stopping the rotative blank movement with the blank approximately in its initial angular position.

26. A machine for threading taps and the like including in combination, means for suppotring and rotating a blank, a rotating cutter for simultaneously cutting a plurality of thread convolutions on the blank as it rotates, means for moving the cutter into predetermined coöperative relation with the blank prior the the rotation of the blank, means for moving the cutter endwise during a single revolution a distance equal to the pitch of the thread, means for reciprocating the cutter in timed relation to the rotation of the blank to effect relieving, and means for stopping the rotative blank movement with the blank approximately in its initial angular position.

27. The combination of means for supporting a blank, means for supplying blanks successively to the supporting means, means associated with the supporting means for gripping each blank after it is supplied and for subsequently rotating the blank, a rotating cutter, and means for bringing the cutter and the blank into predetermined coöperative relation prior to the rotation of the blank.

28. The combination of means for supporting a longitudinally grooved blank, means for supplying blanks successively to the supporting means with the grooves of each blank in a predetermined angular position, means associated with the supporting means for gripping each blank after it is supplied and for subsequently rotating the blank, a rotating cutter, and means for bringing the cutter and the blank into predetermined coöperative relation prior to the rotation of the blank.

29. The combination of means for supporting a blank, a rotating cutter, means for supplying blanks successively to the supporting means with one of the grooves of each blank opposite the cutter, means associated with the supporting means for gripping each blank after it is supplied and for subsequently rotating the blank, and means for bringing the cutter and the blank into predetermined coöperative relation prior to the rotation of the blank.

30. The combination of means for supporting a longitudinally grooved blank, means for supplying blanks successively to the supporting means with the grooves of each blank in a predetermined angular position, means associated with the supporting means for gripping each blank after it is supplied and for subsequently rotating the blank, a rotating cutter, means for bringing the cutter and the blank into predetermined coöperative relation prior to the rotation of the blank, and means for effecting a reciprocatory relieving movement between the cutter and the blank for each groove of the blank as the blank rotates.

31. The combination of means for supporting a blank including two alined centers, means for supplying blanks successively to a position between the centers, means for moving one of the centers to engage the blank with a predetermined pressure after it is supplied, means associated with the other center for gripping each blank and for subsequently rotating the blank, a rotating cutter, and means for bringing the cutter and the blank into predetermined coöperative relation prior to the rotation of the blank.

32. A machine for threading taps and the like including in combination, means for supporting a blank, means for rotating the blank through a single revolution, means for simultaneously cutting a plurality of thread convolutions on the blank during the rotation thereof, means for supplying blanks to the blank support, means for bringing the cutter and blank into predetermined coöperative relation subsequently to the blank-supplying operation and prior to the rotation of the blank, and means for effecting a relative movement between the cutter and the blank support during the rotation of the blank.

33. A machine for threading taps and the like including in combination, means for supporting a blank, means for rotating the blank through a single revolution, means for simultaneously cutting a plurality of thread convolutions on the blank during the rotation thereof, means for supplying blanks to the blank support, means for bringing the cutter and blank into predetermined coöperative relation subsequently to the blank-supplying operation and prior to the rotation of the blank, means for effecting a relative movement between the cutter and the blank support during the rotation of the blank, and means for separating the blank support and the cutter after the rotation of the blank has ceased.

34. A machine for threading taps and the like including in combination, means for supporting a blank, means for rotating the blank through a single revolution, means for simultaneously cutting a plurality of thread convolutions on the blank during its rotation, means for supplying blanks to the blank support, means for bringing the cutter and the blank into predetermined coöperative relation subsequently to the blank-supplying operation and prior to the rotation of the blank, means for effecting during the revolution of the blank a relative movement between the blank support and the cutter in the direction of the axis of the blank equal to the pitch of the thread, means for effecting during the revolution of the blank a predetermined number of reciprocatory movements between the cutter and the blank in a direction transverse to the axis of the blank, and means for separating the blank support and the cutter after the rotation of the blank has ceased.

35. A machine for milling taps and the like including in combination, means for supporting a blank, means for rotating the blank through a single revolution, a milling tool for milling the blank during its rotation, means for supplying blanks to the blank support, means for securing the blank in the blank support, means for bringing the milling tool and the blank into predetermined coöperative relation subsequently to the blank-securing operation and prior to the rotation of the blank, means for effecting a predetermined number of reciprocatory movements between the milling tool and the blank during the rotation of the blank, and means for releasing the blank from the blank support.

36. A machine for threading taps and the like including in combination, means for supporting a blank, means for simultaneously cutting a plurality of thread convolutions on said blank, a support for said cutting means, a member for effecting relative movement between the supports in the direction of the axis of the blank, means for actuating said member to produce said relative movement, independent means for returning said member to starting position, and means for establishing a predetermined initial relation of the supports.

37. A machine for threading taps and the like including in combination, means for supporting a blank, means for simultaneously cutting a plurality of thread convolutions on said blank, a support for said cutting means, a member for effecting relative movement between the supports in the direction of the axis of the blank, means for actuating said member to produce said relative movement, independent means for returning said member to starting position, and means including a fixed abutment and a coöperating device acting with a uniform force for establishing a predetermined initial relation of the supports.

38. A machine for threading taps and the like including in combination, means for supporting a blank, means for simultaneously cutting a plurality of thread convolutions on said blank, a support for said cutting means, a member for effecting relative movement between said support means for actuating said member through different distances to produce different relative movements between the supports, and independent means for returning said member to starting position.

39. A machine for threading taps and the like including in combination, means for supporting a blank, means for simultaneously cutting a plurality of thread convolutions on said blank, a support for said cutting means, a member for effecting relative movement between said supports, means for actuating said member through different distances to produce different relative movements between the supports, independent means for returning said member to starting position, and means for establishing a predetermined initial relation of the supports.

40. A machine for threading taps and the like including in combination, means for supporting a blank, means for simultaneously cutting a plurality of thread convolutions on said blank, a support for said cutting means, a member for effecting relative movement between the supports, means for actuating said member through a relatively great distance in one direction to produce a proportionately small movement of one of the supports with relation to the other, and independent means for actuating said member in the opposite direction to return it to starting position.

41. A machine for threading taps and the like including in combination, means for supporting a blank, means for simultaneously cutting a plurality of thread convolutions on said blank, a support for said cutting means, a member for effecting relative movement between the supports, means for actuating said member through a relatively great distance to produce a proportionately small movement of one of the supports with relation to the other, independent means for returning said member to starting position, and means for establishing a predetermined initial relation of the supports.

42. A machine for threading taps and the like including in combination, means for supporting a blank, means for cutting a thread on said blank, a support for said cutting means, a slide for effecting relative movement between the supports, said slide being arranged to move transversely to said relative movement through a relatively great distance, means for actuating said slide to produce said relative movement, and independent means for returning said slide to starting position.

43. A machine for threading taps and the like including in combination, means for supporting a blank, means for cutting a thread on said blank, a support for said cutting means, a slide for effecting relative movement between the supports, said slide being arranged to move transversely to said relative movement, means for actuating said slide to produce said relative movement, independent means for returning said slide to starting position, and means for establishing a predetermined initial relation of the supports.

44. A machine for threading taps and the like including in combination, means for supporting a blank, means for cutting a thread on said blank, a support for said cutting means, a slide for effecting relative movement between said supports, means for actuating said slide through different distances to produce different relative movements between the supports, independent means for returning said slide to starting position, and means for establishing a predetermined initial relation of the supports.

45. A machine for threading taps and the like including in combination, means for supporting a blank, means for simultaneously cutting a plurality of thread convolutions on said blank, a support for said cutting means, a slide for effecting relative movement between the supports, said slide being arranged to move transversely to said relative movement and having a surface slightly inclined to the path of said movement, means for actuating said slide through a relatively great distance to produce a relatively small movement of one of the supports with relation to the other, and independent means for returning said slide to starting position.

46. A machine for threading taps and the like including in combination, means for supporting a blank, means for simultaneously cutting a plurality of thread convolutions on said blank, a support for said cutting means, a member for effecting relative movement between the supports in the direction of the axis of the blank, means for actuating said member to produce a relative movement, means for releasing said actuating means from said member, and independent means for returning said member to starting position.

47. A machine for threading taps and the like including in combination, means for supporting a blank, means for simultaneously cutting a plurality of thread convolutions on said blank, a support for said cutting means, a member for effecting relative movement between the supports in the direction of the axis of the blank, means for actuating said member to produce said relative movement, means for releasing said actuating means from said member, independent means for returning said member to starting position, means for establishing a predetermined initial relation of the supports, and means for resecuring said actuating means to said member.

48. A machine for threading taps and the like, including in combination, means for supporting a blank, means for simultaneously cutting a plurality of thread convolutions on said blank, a support for said cutting means, a member for effecting relative movement between the supports, means for actuating said member through a relatively great distance to produce a proportionately small movement of one of the supports with relation to the other, means for releasing said actuating means from said member, and independent means for returning said member to starting position.

49. A machine for threading taps and the like including in combination, means for supporting a blank, means for cutting a thread on said blank, a support for said cutting means, a slide for effecting relative movement between the supports, said slide being arranged to move transversely to said relative movement, means for actuating said slide to produce said relative movement, means for releasing said actuating means from said slide, and independent means for returning said slide to starting position.

50. A machine for threading taps and the like including in combination, means for supporting a blank, means for simultaneously cutting a plurality of thread convolutions on said blank, a support for said cutting means, a slide for effecting relative movement between said supports, means for actuating said slide through different distances to produce different relative movements between the supports, means for releasing said actuating means from said slide, independent means for returning said slide to starting position, means for establishing a predetermined initial relation of the supports, and means for resecuring said actuating means to said slide.

51. A machine for milling taps and the like including in combination, means for supporting a blank, means for milling said blank, a support for said milling means, a member for effecting relative movement between the supports, means for actuating said member to produce said relative movement, means for releasing said actuating means from said member, independent means for returning said member to starting position, means for establishing a predetermined initial relation between the supblanks for placing the blank in the support in predetermined relation to the milling tool.

59. A machine for milling taps and the like including in combination, a blank support comprising a member for gripping the blank near one end, a movable member for engaging the opposite end, means for moving the movable member to position the blank with relation to the gripping member, means for actuating the gripping member to secure the blank thereto, means for subsequently actuating the movable member to cause the same to bear with a predetermined force upon the blank, and means for clamping the movable member in its final blank-engaging position.

60. A machine for milling taps and the like including in combination, means for supporting a blank, means for milling the blanks, and means for supplying blanks to said blank supporting means, said blank-supporting means comprising a member for gripping the blank in one end, a movable member for engaging the opposite end, means for transferring the movable member to position the blank with relation to the gripping member, means for actuating the gripping member to secure the blank thereto, means for subsequently actuating the movable member to cause the same to bear with a predetermined force upon the blank, and means for clamping the movable member in its final blank-engaging position.

61. A machine for threading taps and the like including in combination, means for supporting and for rotating a blank, means for simultaneously cutting a plurality of thread convolutions near one end of said blank, and means for moving the cutter in the direction of the axis of the blank through a distance equal to the pitch of the thread during each revolution of the blank, said blank-supporting means comprising a movable member mounted at the opposite side of the blank from the cutter and arranged to engage the end of the blank to be threaded, and means for actuating the movable member to cause the same to bear with a predetermined force upon the blank.

62. A machine for threading taps and the like including in combination, means for supporting and for rotating a blank, means for simultaneously cutting a plurality of thread convolutions near one end of said blank, and means for moving the cutter in the direction of the axis of the blank through a distance equal to the pitch of the thread during each revolution of the blank, said blank-supporting means comprising a movable member mounted at the opposite side of the blank from the cutter and arranged to engage the end of the blank to be threaded, means for actuating the movable member to cause it to bear with a predetermined force upon the blank, and means for clamping the movable member in its final blank-engaging position.

63. A machine for threading taps and the like including in combination, means for supporting a blank, means for rotating the blank, means for simultaneously cutting a plurality of thread convolutions near one end of said blank, and means for moving the cutter in the direction of the axis of the blank through a distance equal to the pitch of the thread during each revolution of the blank, said blank-supporting means comprising a member for gripping the blank near its shank end, a movable member mounted on the opposite side of the blank from the cutter and arranged to engage the end of the blank to be threaded, means for moving the movable member to position the blank with relation to the gripping member, means for actuating the gripping member to secure the blank thereto, means for subsequently actuating the movable member to cause the same to bear with a predetermined force upon the blank, and means for clamping the movable member in its final blank-engaging position.

64. A machine for threading taps and the like including in combination, a blank support comprising a member for engaging one end of the blank, a movable member for engaging the opposite end, said member having a positioning device and a centering device, means for moving the movable member to position the blank by means of the positioning device and for giving the member a second movement to bring the centering device into operation.

65. A machine for milling taps and the like including in combination, a blank support comprising a member for gripping the blank near one end, a movable member for engaging the opposite end, said member having a yielding positioning device and a centering device, means for moving the movable member to position the blank with relation to the gripping member, means for actuating the gripping member to secure the blank thereto, means for subsequently actuating the movable member to render the centering device operative, and means for clamping the movable member in its final blank-engaging position.

66. A machine for threading taps and the like including in combination, means for supporting a blank, means for simultaneously cutting a plurality of thread convolutions on said blank, a support for said cutting means, means for establishing a predetermined relation between said supports prior to the thread-cutting operation, means for effecting a relative movement between the supports in a direction transverse to the axis of the blank, and means for varying the extent of said relative movement.

67. A machine for threading taps and the like including in combination, means for supporting a fluted tap blank, means for rotating the blank through a single revolution, means for simultaneously cutting a plurality of thread convolutions on said blank during said revolution, a support for said cutting means, means for establishing a predetermined relation between said supports prior to the thread-cutting operation, means for effecting a relative reciprocatory movement between the supports in a direction transverse to the axis of the blank, the number of said reciprocations being equal to the number of flutes in the blank, and means for varying the extent of said reciprocatory movements.

68. Organized mechanism for threading a series of taps in succession, each being completely threaded in one revolution in the machine, comprising a magazine for blanks, means for transferring a blank from the magazine to the machine, supports for the blank, means for centering the blank between the supports in a determinate relation to a cutter, means for gripping the blank, and means for rotating it; in combination with a multi-tooth cutter and means for rotating it, means for feeding the cutter and blank relative to one another longitudinally, means for causing the cutter to relieve the thread, means for rotating the blank rapidly when the cutter is between the lands on the blank, means for establishing identical relations of the cutter to the lands in succession, and means for removing the blank from the machine when completed; the said several means being so timed and related that they perform their functions in desired succession with reference to one blank, eject the completed work, and proceed with the next blank automatically, and without manual assistance.

69. In a machine of the character described, a magazine for blanks, supports for a blank, means for feeding a blank from the magazine to the supports in a desired determinate relation to a cutter and for securing it between the supports and rotating it; in combination with a cutter, means for rotating it, means for moving it longitudinally with reference to the blank so as to cut a complete thread of proper pitch upon a land of the blank, means for then rotating the blank at an increased speed to bring another land opposite the cutter, and means for establishing an initial relation between the cutter and the other land identical with that established between the prior land and the cutter; and means for ejecting the work when completed; the said several means being so timed and actuated that they automatically complete a blank during a single revolution thereof in the machine, eject the blank and insert a new one, all successively and continuously without manual assistance.

In testimony whereof, I have signed my name to this specification, in the presence of two subscribing witnesses.

FRIEDERICH MÜLLER.

Witnesses:
 WM. J. DOLAN,
 R. R. MURPHY.